Patented May 6, 1947

2,419,936

UNITED STATES PATENT OFFICE 2,419,936

PREPARATION OF COMPOUNDS WITH MARIHUANA ACTIVITY

Roger Adams, Urbana, Ill.

No Drawing. Application April 29, 1942,
Serial No. 440,971

13 Claims. (Cl. 260—333)

It has been found that from the extracts of hemp (*Cannabis sativa* or *Cannabis indica*) a red viscous oil can be obtained, commonly known as red oil, from which a pure crystalline compound, cannabidiol, can be isolated (Adams, Hunt and Clark, J. A. C. S. 62, 196 (1940). Through a chemical study (J. A. C. S. 62, 196, 732, 735, 1770 (1940); see also J. A. C. S., August and September numbers, 1940), it has been shown to have the structural formula:

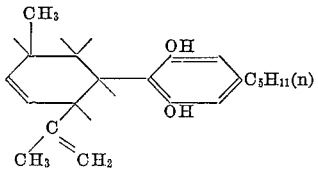

(Formula I)

With the exception of the position of the double bond in the left hand cycle in the above formula the structure of cannabidiol is well established. Investigations show this left hand cycle to be a tetrahydro benzene ring.

Cannabidiol is a crystalline compound, M. P. 66–67° (cor.), and forms long white rods when crystallized from petroleum ether (B. P. 30–60°). It has an $[\alpha]^{27}D-125°$, and is physiologically inactive so far as marihuana activity is concerned.

It has now been found that cannabidiol isomerizes upon treatment, for example, with a variety of reagents such as p-toluenesulfonic acid, sulfuric acid, hydrochloric acid and ethanol, hydrogen chloride in ether, pyridine hydrochloride, sulfamic acid, zinc chloride, ethanolic phosphoric acid, etc. and is converted to tetrahydro cannabinol which has marihuana activity and which may be represented by the following formula, with doubt merely in regard to the position of the double bond in the left-hand cycle.

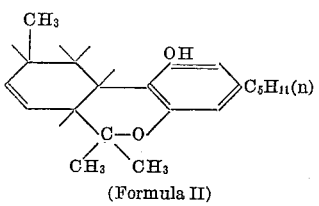

(Formula II)

Depending upon the exact conditions of the isomerization of the cannabidiol to tetrahydro cannabinol, the compositions or products formed may have rotations varying from approximately 130°±5° to 265°±5°. A careful study has indicated that isomerizing reagents such as p-toluenesulfonic acid and sulfuric acid give a product with essentially a constant specific ethanol rotation of about $[\alpha]D-265°$, while mild isomerizing reagents such as very dilute ethanolic hydrochloric acid give a product with essentially a constant specific rotation of about $[\alpha]D-130°$. Conditions of reaction also effect rotation, vigorous conditions, for example, giving compositions of high rotation. Compositions may be obtained as indicated hereinafter giving fractions with rotations ranging somewhere between the two limiting figures just mentioned. They are believed to be mixtures of the $[\alpha]D-130°$ and 265° isomers. All of the tetrahydro cannabinol products thus formed, however, regardless of the specific rotation, have a marihuana activity and manifold the activity of purified red oil.

That the products in hand are tetrahydro cannabinols has been demonstrated by dehydrogenation of any of them to 1-hydroxy-3-n-amyl-6,6,9-trimethyl-6-dibenzopyran (cannabinol), the constitution of which is known (J. A. C. S., August and September 1940) and may be represented by the following formula:

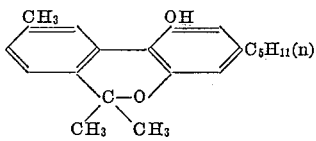

(Formula III)

On account of the relationship to cannabidiol, and on the basis of other indirect evidence, it appears that the double bond in the left-hand nucleus of tetrahydro cannabinol $[\alpha]-130°$ is probably in the position indicated in Formula II. The higher rotating material $[\alpha]-265°$ probably has the double bond as shown in the following formula:

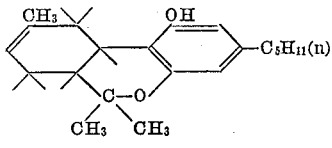

(Formula IV)

The tetrahydro or left-hand cycle of Formulas II and IV may be represented by the following detailed formulas:

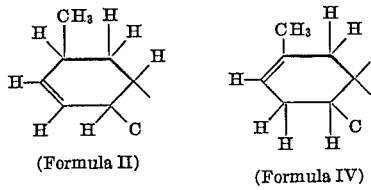

(Formula II)        (Formula IV)

The lower rotating tetrahydro cannabinols can be readily converted to the higher rotating form by means of the same treatments which convert cannabidiol to the higher rotating form. For this reason it appears that a mere shift in the double bond is occurring, i. e., that the low and high rotating forms differ in the position of the double bond in the left-hand or hydro cycle.

The present invention is directed broadly to all materials obtained by isomerization of cannabidiol, the exact position of the double bond in the product being of relatively minor importance. The tetrahydro canabinols obtained are colorless, highly viscous oils, though it is not impossible that eventually when one or more are obtained in absolutely pure state they will be found to be solids.

The tetrahydro cannabinols form acyl derivatives, such as the monoacetates, and ether derivatives such as the monomethyl ether, with specific rotations corresponding to the rotation of the tetrahydro cannabinol from which each may be formed.

When the tetrahydro cannabinols are reduced, regardless of the specific rotation of the initial material used, after absorption of one molecule of hydrogen a hexahydro cannabinol is produced.

This product has a $[\alpha]^{27}$ D—70°; is physiologically active and may be represented by the following formula:

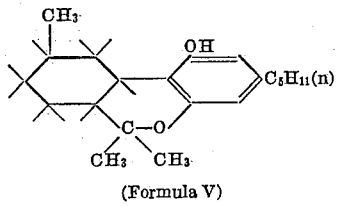

(Formula V)

The pharmacological values of these various products were tested by the method of "Bioassay by Approximation" (J. A. Pharm. Assoc. 28:427, J., Pharm. Exp. Therap. 66:23). This procedure has been shown to demonstrate statisfactorily the activity of red oil from hemp.

The principal object of the present invention is to provide processes and products for use in the pharmacological art.

Other objects will be apparent as the description proceeds.

The following examples will serve to illustrate the present invention.

I. FORMATION OF TETRAHYDRO CANNIBINOLS BY ISOMERIZATION OF CANNABIDIOL

A. By p-toluenesulfonic acid

A solution of about 0.19 gram of p-toluenesulfonic acid monohydrate and 3.14 grams of crystalline cannabidiol in 100 cc. of dry benzene was refluxed for one and one-half hours. At the end of that time the alkaline Beam test was negative. The benzene solution was extracted twice with about 5% aqueous bicarbonate solution and twice with water. The benzene was then evaporated and the residue distilled under reduced pressure. Four fractions were collected, B. P. 169–172° (0.03 mm.), having essentially the same rotation, $[\alpha]^{29}$ D—264° to —270°.

*Rotation.*—0.0694 gram made up to 5 cc. with 95% ethanol at 29° gave $[\alpha]$ D—3.70°; 1, 1; $[\alpha]^{29}$ D—267°.

B. By sulfuric acid

To a solution of 1.94 grams of crystalline cannabidiol in 35 cc. of cyclohexane (free from unsaturated material) was added one drop of 100% sulfuric acid. The mixture was refluxed for one hour, at the end of which time the alkaline Beam test was negative. The solution was decanted from the sulfuric acid, washed twice with aqueous 5% bicarbonate solution and twice with water, and evaporated. The residue was distilled under reduced pressure. Three fractions were collected, B. P. 165–170° (0.1 mm.), $[\alpha]^{29}$ D—259° to —269°.

*Rotation.*—0.0381 gram made up to 5 cc. with acetone at 29° gave $[\alpha]$ D—2.10°; 1, 1; $[\alpha]^{29}$ D—264°.

C. By very dilute ethanolic hydrochloric acid

A solution of 3.14 grams (0.01 mole) of cannabidiol in 100 cc. of absolute ethanol containing 0.0005 mole of hydrogen chloride (added as 0.5 M ethanolic hydrochloric acid) was refluxed on the steam bath for eleven hours. At the end of this time the alkaline Beam test had become negative. The reaction mixture was poured into cold water and the product extracted with ether. The ether extract was washed with dilute aqueous sodium bicarbonate solution followed by water. The residue remaining upon drying and evaporating the ether was distilled; colorless, highly viscous liquid, B. P. 157–160° (0.05 mm.), $n_D^{20}$ 1.5425. Five fractions of the distillate were collected, the specific rotation values being essentially $\alpha$ D—130° ±5°.

D. By hydrogen chloride in ethanol

A solution of 3.14 g. (0.01 mole) of cannabidiol (M. P. 66–67°) in 100 cc. of absolute ethanol containing 0.001 mole of hydrogen chloride (added as ethanolic hydrochloric acid) was refluxed on a steam bath for eight hours. At the end of this time the Beam test (purple color with 5% ethanolic potassium hydroxide) had become negative indicating that the reaction had gone to completion. The reaction mixture was then poured into water, the product extracted with ether and the ether extract was washed with water, dilute aqueous sodium bicarbonate and again with water. After drying and evaporating the ether, the residue was distilled, yielding a colorless, highly viscous oil, B. P. 188–190° (2.5 mm.); 158–160° (0.05 mm.); $n_D^{20}$ 1.5432. Six fractions of the distillate were collected, the specific rotation values of each being essentially the same.

*Rotation.*—0.0297 g. made up to 5 cc. with 95% ethanol at 27° gave $\alpha$D—1.90; 1, 2; $[\alpha]^{27}$D—160°. Zerewitinoff. 0.246 g. gave 16.0 cc. of methane (S. T. P.). Calculated for one OH, 17.5 cc. of methane.

*Anal.*—Calcd. for $C_{21}H_{30}O_2$: C, 80.21; H, 9.62. Found: C, 79.90; H, 9.52.

It was found that varying the quantities of reactants, although in the same proportion, sometimes gave a product with a specific rotation varying 7° to 10° from the above value. Using a larger proportion of hydrochloric acid up to 1.5 moles per mole of cannabidiol caused addition of hydrogen chloride to the double bond but distillation of the product resulted in the loss of hydrogen chloride and a chlorine-free material. It had the same B. P. as previously recorded but the specific rotation of various fractions varied widely. Thus, in several typical runs the following values for successive fractions were obtained.

(a) 1 mole hydrogen chloride and 1 mole cannabidiol refluxed for 5 hours gave fractions $[\alpha]^{30}D$ —146°, —191°, —223°.

(b) 1.5 moles hydrogen chloride and 1 mole cannabidiol refluxed for 7 hours gave fractions $[\alpha]^{28}D$ —163°, —174°, —215°.

(c) 0.75 mole hydrogen chloride and 1 mole cannabidiol refluxed for 2.75 hours gave fractions $[\alpha]^{27}D$ —207°, —219°, —235°, —234°.

E. By hydrogen chloride in ether

A solution of 3.1 g. of cannabidiol (M. P. 66–67°) was prepared in 50 cc. of dry ether which had been saturated previously with dry hydrogen chloride at 0°. The solution was allowed to stand for four hours at 0°, then poured onto ice. The ether layer was separated, washed with aqueous sodium bicarbonate and water, dried and distilled. The remaining oil which contained chlorine was heated with 10 cc. of quinoline for two hours at 185–190°. After cooling, the reaction mixture was poured into cold 10% sulfuric acid. The product was extracted with ether and the ether solution washed with dilute sulfuric acid, with aqueous sodium bicarbonate and then with water. The cyclization resulted in a substance with the same boiling point as that previously reported above. Four fractions gave variable rotations: $[\alpha]^{29}D$ —166°, —180°, —188°, —191°.

F. By pyridine hydrochloride

A mixture of 6 g. of dry pyridine hydrochloride and 3 g. of cannabidiol (M. P. 66–67°) was heated at 125° for one hour. The Beam test (purple color with 5% alcoholic potassium hydroxide) had entirely disappeared after a relatively short time. The product was then washed with water to free it from pyridine hydrochloride, extracted with ether and the ether solution washed with water. After evaporation of the solvent, the product was distilled in high vacuo, whereupon hydrogen chloride was evolved. The distillate was a highly viscous, colorless oil with a B. P. approximately the same as that reported in the experiments using hydrochloric acid in ethanol for cyclization. Upon separating into six fractions, the specific rotations were as follows: $[\alpha]^{32}D$ —235°, —236°, —235°, —241°, —244°, —249°.

Rotation.—(Fraction 1) 0.0314 g. made up to 5 cc. with 95% ethanol at 32° gave $\alpha D$—2.95°; 1, 2; $[\alpha]^{32}D$ —235°.

G. By phosphoric acid

A mixture of 3 g. of cannabidiol (M. P. 66–67°), 150 cc. of ethanol and 50 cc. of syrupy phosphoric acid (85%) was refluxed for thirty-five minutes. The Beam test was negative. The reaction solution was then poured into water and the product extracted with ether. Six fractions were collected in distillation, all of which gave essentially the same specific rotation, $[\alpha]^{26}D$ —160°. This product appears, therefore, to be the same as that prepared by the example ethanolic hydrochloric acid method D.

Rotation.—(Fraction 3) 0.0481 g. made up to 5 cc. with 95% ethanol at 26° gave $\alpha D$—1.54; 1, 1; $[\alpha]^{26}D$ —160°.

If the reaction mixture was refluxed two hours instead of thirty-five minutes with the proportions 3 g. of cannabidiol, 55 cc. of ethanol, 20 cc. of syrupy phosphoric acid (85%), a product was obtained which gave fractions with specific rotations varying from —188° to —199°. Upon refluxing one of these fractions for twelve hours with ethanol and phosphoric acid, the product gave a specific rotation of —179°.

It is obvious that changes are taking place within the molecule by the treatments just described. Investigations indicate the changes to be due to shifting of the double bond or interchange of stereoisomers or both.

H. Sulfamic acid; zinc chloride

Processes employing sulfamic acid or zinc chloride follow the general process described above. Upon heating cannabidiol with these reagents, the Beam test rapidly disappeared. From a sulfamic acid experiment at 125° (0.5 g. of cannabidiol, 1 g. of sulfamic acid), the product gave a specific rotation of —250°.

II. Hexahydro Cannabinol by Reduction of Tetrahydro Cannabinol

A solution of 3.14 g. of tetrahydro cannabinol ($[\alpha]^{27}D$—160°), which had been distilled in high vacuo in an all-glass apparatus, in 50 cc. of glacial acetic acid was reduced with hydrogen at room temperature, using 0.1 g. of platinum oxide as catalyst. Hydrogen corresponding to 0.96 mole per mole of tetrahydro cannabinol was absorbed in about four hours, after which hydrogenation continued to proceed but at a very much slower rate. After absorption of one mole equivalent of hydrogen, the solution was filtered and the acetic acid removed in vacuo. The hexahydro cannabinol formed a colorless, highly viscous resin, B. P. 153–155° (0.1 mm.) (bath temp. 180–185°) $n_D^{20}$ 1.5348.

Rotation.—0.0252 g. made up to 5 cc. with 95% ethanol at 27° gave $\alpha D$—0.71; 1, 2; $[\alpha]^{27}D$—70°.

Anal.—Calcd. for $C_{21}H_{32}O_2$: C, 79.69; H, 10.19. Found: C, 79.35; H, 10.43.

It was found that regardless of the initial rotation of the tetrahydro cannabinol used, the hexahydro product always had essentially the same specific rotation. This indicates that the tetrahydro products probably differ merely in the position of the double bond.

III. Tetrahydro Cannabinol Monoacetate

A. A mixture of tetrahydro cannabinol $[\alpha]^{34}D$—164 was heated with acetic anhydride and a little fused anhydrous sodium acetate for two hours and worked up in the usual manner. The desired acetate product is a colorless, viscous oil, B. P. 156–158° (0.07 mm.), (bath temperature 175°); $n_D^{20}$ 1.5232.

Rotation.—0.0281 g. made up to 5 cc. with 95% ethanol at 34° gave $\alpha D$—1.88; 1, 2; $[\alpha]^{34}D$—167°.

B. Tetrahydro cannabinol $[\alpha]^{32}D$—240° was acetylated as described in A above. This product obtained from the higher rotating isomer is a colorless, viscous oil, B. P. 172–174° (0.08 mm.) (bath temp. 195°); $n_D^{20}$ 1.5242.

Rotation.—0.0373 g. made up to 5 cc. with 95% ethanol at 34° gave $\alpha D$—1.72; 1, 2; $[\alpha]^{34}D$—229°.

IV. Tetrahydro Cannabinol Monomethyl Ether

A. Tetrahydro cannabinol $[\alpha]^{34}D$—164 was refluxed for 15 hours with anhydrous potassium carbonate and methyl iodide in acetone solution. The ether product was purified from unchanged tetrahydro cannabinol by means of Claisen's potash and yields a colorless, viscous oil, B. P. 168–

170° (0.08 mm.) (bath temperature 190–195°); $n_D^{20}$ 1.5323.

*Rotation.*—0.0395 g. made up to 5 cc. with 95% ethanol at 32° gave αD—1.31; 1, 1; $[\alpha]^{32}D$—166°.

B. Tetrahydro cannabinol $[\alpha]^{32}D$—240° was methylated as described in A above. This product obtained from the higher rotating isomer is a colorless, viscous oil, B. P. 152–153° (0.03 mm.) (bath temp. 185°); $n_D^{20}$ 1.5343.

*Rotation.*—0.0337 g. made up to 5 cc. with 95% ethanol at 32° gave αD—1.52; 1, 1; $[\alpha]^{32}D$—226°.

Other alkyl ethers and other acyl derivatives of the tetra-or hexahydro cannabinols may be prepared in accordance with the processes of Example III and IV. Examples include the ethyl and propyl ethers and the propionates and butyrates. The following general formula is representative of the composition of the present invention:

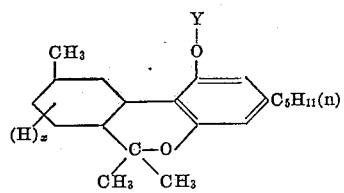

where $x$ is 7 or 9 and $y$ is an alkyl group or an acyl group; when $x$ is 7 the left-hand cycle is a tetrahydro benzene ring with one double bond and when $x$ is 9 the left-hand cycle is a hexahydro benzene ring containing no double bonds. In Formulas II and IV $x$ is 7 and in Formula V $x$ is 9. In the formulas —C₅H₁₁(n) stands for the normal amyl group.

The isolation of cannabidiol from red oil obtained from hemp is described in detail in J. A. C. S. 62, 196 (1940). This process which includes the treatment of purified red oil with 3,5-dinitrobenzoyl chloride and the formation of cannabidiol bis-3,5-dinitrobenzoate has been found of particular value for the isolation of the desired product. Ammonolysis of the benzoate, i. e., diester, yields cannabidiol in pure form. This process forms the subecjt matter of my co-pending application Serial No. 352,931.

It will be obvious to those skilled in the art that the present invention is directed to the treatment of red oil (obtained from hemp and preferably American hemp) as well as the treatment of isolated cannabidiol. For example, a product of increased activity or potency may be obtained by treating purified red oil obtained from Minnesota wild hemp so as to isomerize the cannabidiol contained therein to tetrahydro cannabinol. It will also be understood by those skilled in the art that the present invention is not limited to any particular acid isomerizing agent or process, the processes of Example I being merely illustrative. Any treatment or agent of the type described which will change cannabidiol to tetrahydro cannabinol, i. e., form the center cycle or pyran ring, is included within the scope of the present invention.

The products of the present invention have utility in the therapeutic field, as, for example, in the treatment of "dope" addicts and alcoholics. A specific use is to eliminate or ameliorate the withdrawal symptoms experienced in the treatment of opiate derivative addictions.

The present application is a continuation-in-part of my co-pending applications Serial No. 352,931, now Patent No. 2,304,669, and Serial No. 401,656.

I claim:

1. Tetrahydro cannabinols represented by the following formula:

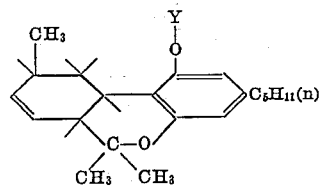

in which Y is selected from the group consisting of hydrogen, methyl and acetyl groups; said tetrahydro-cannabinol compound being substantially free of cannabidiol and of toxic impurities, and optically active.

2. Tetrahydro cannabinols represented by the following formula:

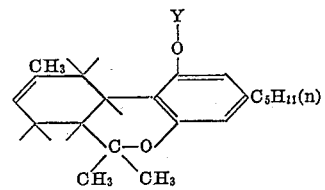

in which Y is selected from the group consisting of hydrogen, methyl and acetyl groups; said tetrahydro-cannabinol compound being substantially free of cannabidiol and of toxic impurities, and optically active.

3. The process of converting cannabidiol to a physiologically active isomer tetrahydro cannabinol, which comprises treating cannabidiol with an acidic isomerizing agent.

4. The process of converting cannabidiol to a tetrahydro cannabinol containing a pyran ring, which comprises heating cannabidiol in the presence of dilute ethanolic hydrochloric acid.

5. The process of converting cannabidiol to a tetrahydro cannabinol containing a pyran ring, which comprises heating cannabidiol in the presence of p-toluene-sulfonic acid in benzene solution.

6. The process of converting cannabidiol to a tetrahydro cannabinol containing a pyran ring, which comprises heating cannabidiol in the presence of a sulfuric acid-cyclohexane solution.

7. Isomers of cannabidiol characterized by the presence of a pyran ring, said isomers being tetrahydrocannabinols and corresponding to the tetrahydrocannabinols formed by the acidic isomerization of cannabidiol; said isomer being substantially free of cannabidiol and of toxic impurities, and optically active.

8. An isomer of cannabidiol characterized by the presence of a pyran ring, said isomer being a tetrahydrocannabinol having a specific rotation in ethanol of about $[\alpha]D$—130±5°; said isomer being substantially free of cannabidiol and of toxic impurities.

9. An isomer of cannabidiol characterized by the presence of a pyran ring, said isomer being a tetrahydrocannabinol having a specific rotation in ethanol of about $[\alpha]D$—265±5°; said isomer being substantially free of cannabidiol and of toxic impurities.

10. The process of preparing marihuana active compounds from red oil, which comprises: precipitating cannabidiol from said oil in the form of a bis-3,5-dinitrobenzoate; separating the precipitate; reconverting the separated precipitate to regenerate the cannabidiol; and isomerizing the cannabidiol to tetrahydrocannabinol.

11. The process of preparing marihuana active compounds from red oil, which comprises: separating cannabidiol from said oil by reacting it with a compound forming an insoluble cannabidiol ester; separating the precipitate; reconverting the separated precipitate to regenerate the cannabidiol; and isomerizing the cannabidiol to tetrahydrocannabinol.

12. A therapeutic substance derived from crude cannabinol and consisting essentially of pure cannabinol hydrogenated with not less than four hydrogen atoms per molecule; said compound having marihuana activity of relatively constant value and many times greater than the activity of crude cannabinol; said substance being substantially free of cannabidiol and of toxic impurities.

13. A therapeutic substance having marihuana activity consisting essentially of isomers of cannabidiol, said isomers being tetrahydrocannabinols having an optical rotation in ethanol varying from about $[\alpha]D-125°$ to $[\alpha]D-270°$; said substance being substantially free of cannabidiol and of toxic impurities.

ROGER ADAMS.

REFERENCES CITED

The following references are of record in the file of this patent:

FOREIGN PATENTS

| Number | Country | Date |
| --- | --- | --- |
| 285,829 | Germany | July 12, 1915 |

OTHER REFERENCES

Hiss and Ebert, New Standard Formulary, Chicago, Englelhard & Co., 1920, 5th ed., revised, page 137.

Dispensatory of U. S. of America, Wood-Lawall, 21 ed., pages 277–281.

Science (Adams), August 9, 1940, pages 115–119.

Science (Haagen-Smit et al.), June 21, 1940, pages 602–603.

Journal American Chem. Soc. (Adams), pages 2401–2405, Sept. 1940.

Blatt, Journal of Washington Academy of Sciences, vol. 28 (1938), pages 465–476.

Bergel, Todd, & Work, Chem. and Ind., 1938, page 86.

Casparis and Baur, Pharm. Acta Helvet., vol. 2, page 107 (1927).

Wollner et al., Journal Amer. Chem. Soc., Jan. 1942, pages 26–29.

Frankel-Archiv fur Experimentelle Pathologie und Pharmakologie (1902–1903), vol. 49, pages 272–284.